United States Patent [19]
Abrahamian

[11] Patent Number: 5,967,791
[45] Date of Patent: Oct. 19, 1999

[54] ASTRONOMICAL DISPLAY APPARATUS

[76] Inventor: Jaques Abrahamian, 1625 Elizabeth St. #06, Pasadena, Calif. 91104

[21] Appl. No.: 09/072,969

[22] Filed: May 5, 1998

[51] Int. Cl.$^6$ .............................. G09B 23/00; G09B 27/02
[52] U.S. Cl. ............................................. 434/284; 434/291
[58] Field of Search .................................... 434/276, 277, 434/278, 290, 291, 292, 293, 284; 446/236

[56] References Cited

U.S. PATENT DOCUMENTS

| | | | |
|---|---|---|---|
| D. 210,075 | 2/1968 | Musser | D25/1 |
| 3,089,259 | 5/1963 | Miller | 434/291 |
| 3,387,393 | 6/1968 | Musser | 434/291 |
| 3,733,720 | 5/1973 | Byers | 434/291 |
| 4,080,009 | 3/1978 | Marathe et al. | 384/12 |
| 4,378,134 | 3/1983 | Eddy | 308/3.5 |
| 4,400,162 | 8/1983 | Rustemis | 434/291 |
| 4,713,011 | 12/1987 | Alnafissa | 434/292 |
| 5,380,099 | 1/1995 | Teramachi | 384/45 |
| 5,488,771 | 2/1996 | Devitt et al. | 29/898.02 |
| 5,564,188 | 10/1996 | Akasako et al. | 384/15 |

Primary Examiner—Paul J. Hirsch
Assistant Examiner—Michael B. Priddy
Attorney, Agent, or Firm—Goldstein & Camno

[57] ABSTRACT

An astronomical display apparatus for providing a 3-dimensional view of a plurality of scaled astronomical bodies, wherein the bodies may be elevated (to float) upon a column of air while being slowly rotated. The display apparatus includes a base having an upper, preferably flattened deck surface. The base further includes an air supply inlet tube that is coupled to air cups mounted on the deck surface to enable a source of pressurized air emitted from the air cups to form the columns of air. The apparatus may be provided with several interchangeable deck surfaces wherein each deck surface may represent a distinct collection or grouping of astronomical bodies, such as stars, planets, and or moons.

9 Claims, 3 Drawing Sheets

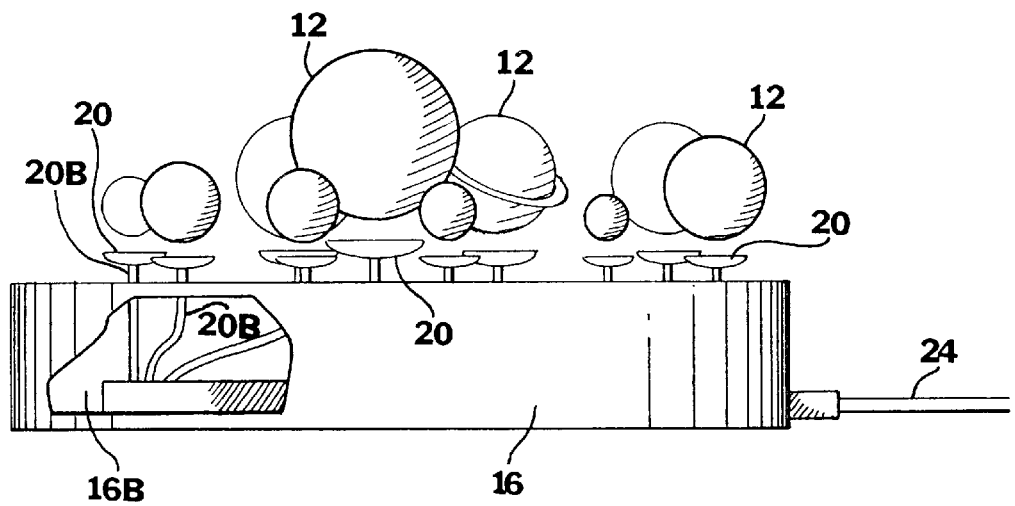
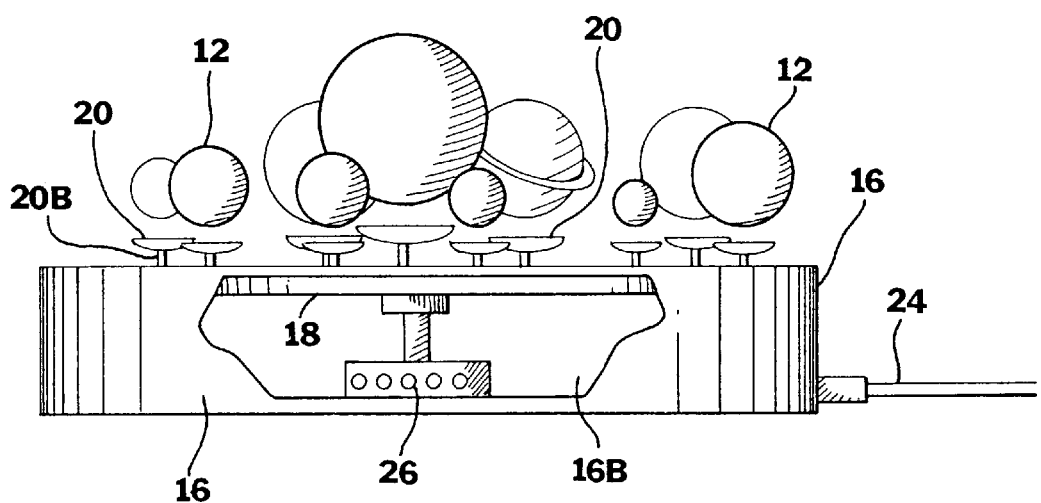

ASTRONOMICAL DISPLAY APPARATUS

BACKGROUND OF THE INVENTION

1. Field of the Invention

The present invention relates generally to display and presentation devices. More particularly, the invention relates to a scaled astronomical display apparatus to provide a simulated 3-D rendering of a group of astronomical bodies, such as stars, planets, moons, and the like.

2. Background and Objects of the Invention

Simple and effective display apparatus are essential for introducing new subject matter to students and other unfamiliar persons. As the theory of science can be somewhat dry, educators and lecturers often turn to devices and apparatus that capture the essence of a subject, as well as an on-lookers attention. Next, after an overview has been presented via a display apparatus, and or other suitable means, the theory and associated topics may be presented and discussed.

When considering astronomical simulators and demonstration apparatus, a typical prior art display-type device is represented by U.S. Pat. No. 4,713,011 to Alnafissa, which discloses a 'Solar System Simulator'. The Alnafissa invention is a complicated mechanical simulation device of a scaled representation of Earth and our solar system. This apparatus enables the relative circumferential motion of the planets around the sun in simulated orbits while floating on air. This invention also includes a plurality of blower devices to aid in powering and elevating the simulated planets and the sun, and further requires internal gears, wheels, and a variety of other structures. This device is not a low cost device, and may be prone to mechanical failure. Further, this device is limited to only being able to simulate Earth and our solar system.

The art presently lacks a low cost display apparatus having a simple construction that will still capture the interest of one or more individuals during a lesson, lecture or seminar. Objects of the present invention are, therefore, to provide new and improved astronomical display apparatus (e.g., simulators) having one or more of the following capabilities, features, characteristics, and/or advantages:

display device capable of presenting an arrangement of simulated astronomical bodies;

simple base unit design with rotating deck surface;

configured requiring only a means to supply (or to produce) a source of pressurized air;

easily constructable using many plastic low-cost parts;

scaled astronomical bodies may be provided in a foam material or substance, and preferably may be covered with a self-illuminating or glow-in-the-dark type of covering;

may include a plurality of easily changeable deck surfaces simulating differing arrangements of stars, planets, moons, etc.; and having a simple low cost construction.

The above listed objects, advantages, and associated novel features of the present invention, as well as others, will become more clear with a careful review of the description and figures provided herein. Attention is called to the fact, however, that the drawings and the associated description are illustrative only, and variations are certainly possible.

SUMMARY OF THE INVENTION

In accordance with the present invention a display apparatus is disclosed for providing a 3-dimensional view of a plurality of lightweight spherical bodies, which may for example represent the Earth and our solar system, constellations, etc. A base is included having an upper, preferably flattened deck surface and an interior chamber at least partially formed by the flattened deck surface. An air supply inlet tube is coupled to the interior chamber, possibly via other intermediate structures or air conduits. The air supply inlet tube may be coupled to a suitable air supply providing a source of pressurized air to energize and or power the display apparatus.

Also included are a plurality of air cups, each having an air-support tube coupled through the deck surface to the interior chamber (and functionally to the air supply inlet tube). Additionally, each air cup has at least one air outlet or nozzle situated in a lower cup portion of the air cup. The air outlet is fed air through the air-support tube and the interior chamber. It may also be noted that the plurality of air cups are each configured to hold a spherical body (i.e., a scaled astronomical body) and when pressurized air is supplied to the air supply inlet tube, each air cup will develop a column of air, possibly formed of a plurality of directed streams of air, to elevate the respective bodies held therein.

In a preferred embodiment of the invention a plurality of interchangeable deck surfaces may be provided wherein each (deck surface) may represent a distinct collection of astronomical bodies, such as stars, planets, and or moons. For example, one deck surface may represent Earth and our solar system, while others may represent famous constellations. Preferred embodiments may also be provided with a deck surface that is rotatably mounted and possibly rotated by a motor suitably coupled to the deck surface and mounted within the base.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of many possible arrangements utilizing the fundamental concepts of the present invention. The drawings are briefly described as follows:

FIG. 4 depicts a partially cut-away side view of an embodiment of the invention depicting an interior chamber.

FIG. 5 illustrates yet another embodiment of the invention shown in a partially cut-away side view.

LIST OF REFERENCE NUMERALS USED IN THE DRAWINGS

10—(astronomical) display apparatus
12—spherical bodies
16—base or base unit
16b—interior chamber (of base)
18—deck surface
20—air cups
20a—lower region of the air cups
20b—air-support tube
20c—air outlet (or nozzle)
24—air supply inlet tube
26—motor

DETAILED DESCRIPTION OF THE PREFERRED EMBODIMENTS

It is important to establish the definition of several terms and expressions that will be used throughout this disclosure. The expressions 'display apparatus' and 'astronomical display apparatus', and the like, are to be assumed to be equivalents and may be used interchangeably. The term 'deck surface' is to be defined as the upper portion of a base or base unit of the invention, wherein the deck surface may preferably be provided as a disk shaped plate, possibly being substantially flat. The term 'lightweight', as applied to 'lightweight spherical bodies', is intended to indicate ball shaped articles having a sufficiently low weight or mass that will enable each (i.e., of the respective bodies) to be lifted or elevated upon a column of (pressurized flowing) air emitted from the air cups. Accordingly, a variety of common well known 'foam substances' are preferable for embodying the spherical (scaled astronomical) bodies of the present invention. The 'column of air' may be formed of one or more directed streams of air suitably oriented or aimed to elevate and support a respective spherical body. An air supply providing a source of pressurized air is required to activate or energize preferred embodiments of the invention, and may be provided by compressor units, and or air supplying pressurized storage tanks that are either external to the display apparatus, or internal to the base thereof. Finally, the term 'scaled' when used in the expression 'scaled astronomical bodies' is to indicate that a plurality of the spherical bodies are provided in a greatly reduced size, possibly with the relative size of one or more of the plurality of bodies being preserved.

Figure 1:
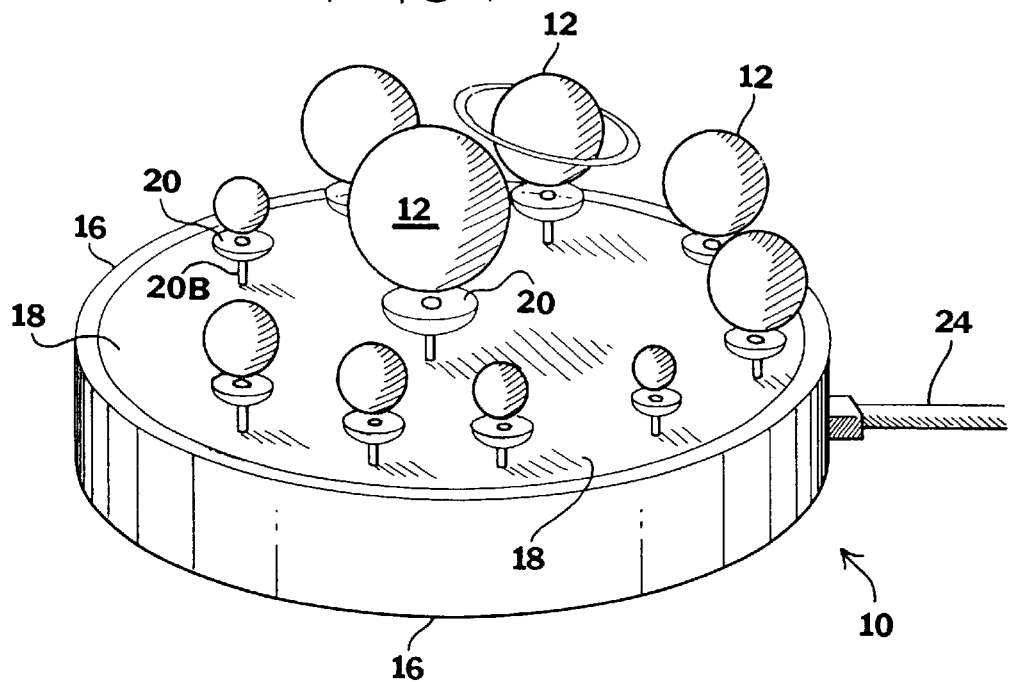
FIG. 1 provides a perspective view of an embodiment of the display apparatus according to the present invention.

Referring now to FIG. 1, there is shown therein a perspective view of a display apparatus 10 for providing a 3-dimensional view of a plurality of spherical (astronomical) bodies 12. The apparatus includes a base 16 having an upper, preferably somewhat flattened deck surface 18. The base 16 houses (or forms therein) an interior chamber 16b (best seen in FIGS. 4 and 5), which is partially formed by the deck surface 18. Fixed to the deck surface 18 are a plurality of air cups 20, each having a substantially vertically oriented air-support tube 20b coupled through the deck surface 18 to the interior chamber 16b (and possibly other structures), and to an air supply inlet tube 24. The air cups 20 are formed with a concave upwardly facing upper surface that will hold a (nested) spherical body therein. Each air cup 20 further has an air outlet, or a nozzle, situated in a lower cup portion 20a of the air cup 20, which is fed pressurized air by way of the air-support tube 20b.

The air supply inlet tube 24, which is coupled on a first end to the interior chamber 16b, and may also be coupled to an air supply such as a pressurized air source (not shown), to supply pressurized air to drive and energize the display apparatus 10. The energizing of the display apparatus 10 may be setup and realized as follows. Assume a plurality of the air cups 20 are each holding a spherical body 12. When the air supply is coupled and turned on, a supply of pressurized air is fed to the interior chamber 16b of the display apparatus 10, suitably and slightly pressurizing the interior chamber. The air will be directed through the interior chamber 16b and flow into, or pass through the air-support tubes 20b of the air cups 20 and elevate the respective spherical bodies 12, which would preferably be elevated 1 to 5 inches above the air cup 20.

An important feature of the present invention provides preferred embodiments of the display apparatus 10 with one or more interchangeable deck surfaces 18, which may be rotatably secured to the base. Skilled persons will be able to supply various mechanical arrangements, including a threaded ring at the top of the base 16 (not shown), that would enable a user to select and change one deck surface for another. The provision of a plurality of interchangeable deck surfaces, wherein each deck surface may represent a distinct collection of astronomical bodies, such as stars, planets, and or moons, would enable a variety of arrangements of astronomical bodies to be discussed employing a single apparatus, such as display apparatus 10 according to the present invention.

The rotatable mounting enables the deck surface 18 to be slowly rotated by a suitably coupled motor, preferably energized or driven by air fed into the air supply inlet tube 24. In an alternate embodiment, the air supply inlet tube 24 may be replaced by an electrical plug. Accordingly, as shown in FIG. 5, an air powered motor 26, may be mounted within the interior chamber of the base 16 and coupled (either directly as shown or via gears) to the deck surface 18 to cause the slow rotation of the deck surface and a plurality of associated spherical bodies 12. The term 'slow rotation' may be assumed to be a revolution rate in the revolutions per minute (rpm) range.

Figure 2:
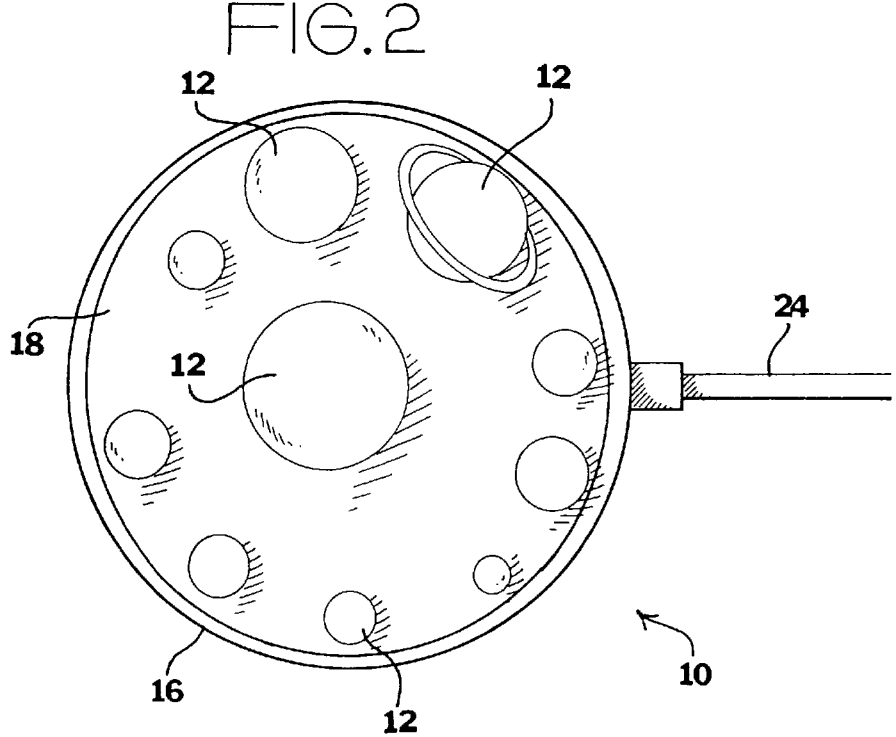
FIG. 2 provides a plan view of an embodiment of the display apparatus.
Figure 3:
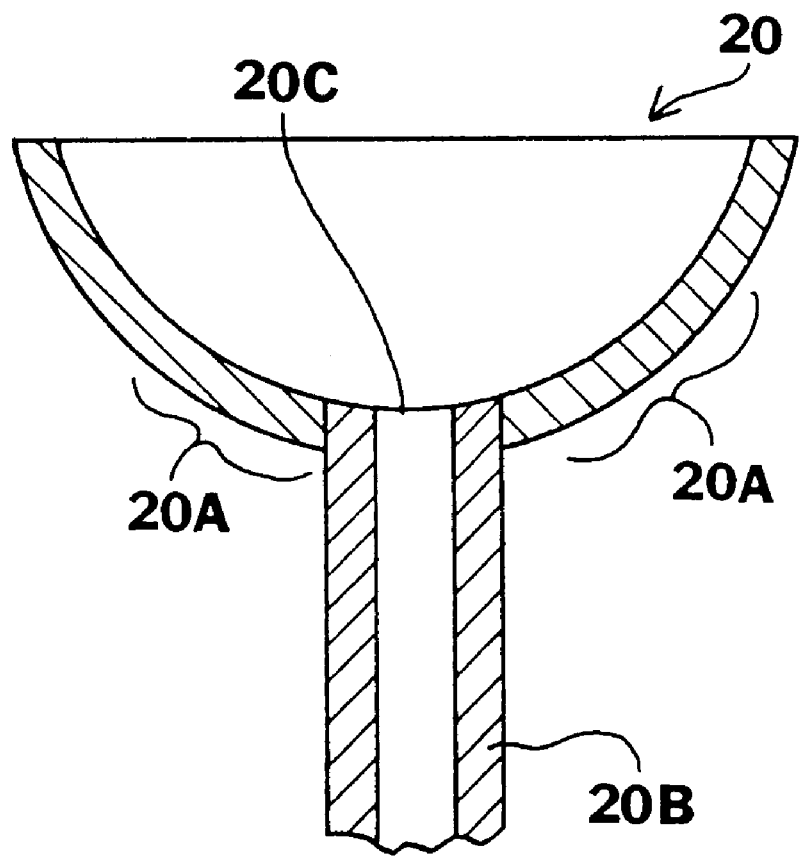
FIG. 3 provides an enlarged cut-away view of an embodiment of an air cup of the present invention.

Turning to FIG. 2, there is depicted a plan view of an embodiment of the display apparatus 10 of the invention. The display apparatus 10 is shown having a substantially circular outline and footprint. Accordingly, the deck surface is configured with a circular shape to mate with the base 16, and as shown may include a collection of spaced spherical bodies 12. In a preferred embodiment of the present invention the spherical bodies 12 would be provided as ball shaped articles having a sufficiently low weight that will enable the respective bodies to be lifted or elevated on a column of air formed by a pressurized air supply coupled to the air supply inlet tube 24 and channeled to the 'air cup' 20 air-support tube 20b. In a most preferred embodiment the (astronomical) spherical bodies of the invention would be composed of foam, possibly having a reflective and or self-illuminating cover.

It is important to understand that the description of the embodiments of the display apparatus according to the present invention are illustrative only, and other equivalent arrangements are certainly possible. For example, the base 16 may be provided with a taller column shape, possibly configured as a floor standing unit or device. Alternately, the present invention may be a provided with a base not having a circular footprint. Also, the scale of the invention may vary considerably, ranging from a desk-top unit to a size filling part or most of a room. Therefore, while there have been described the currently preferred embodiments of the present invention, those skilled in the art will recognize that other and further modifications may be made without departing from the present invention, and it is intended to claim all modifications and variations as fall within the scope of the appended claims.

What is claimed is:

1. A display apparatus for providing a 3-dimensional view of a plurality of lightweight spherical bodies, the apparatus comprising:

a) a base having an upper, preferably flattened deck surface and an interior chamber partially formed by the deck surface;

b) an air supply inlet tube that is coupled to the interior chamber, and which is further coupled to an air supply providing a source of pressurized air to the internal chamber; and c) a plurality of air cups, each having an air-support tube coupled through the deck surface to the air supply inlet tube via the internal chamber, and further having an air outlet situated in a lower cup portion of the air cup that is fed pressurized air through the air-support tube;

d) the air cups configured so that each will hold a spherical body and elevate the body when pressurized air that is coupled into the base of the display apparatus via the air supply inlet tube exits the air outlets of the respective air cups, e) wherein the deck surface is rotatably mounted to the base and is arranged to be slowly rotated by a motor coupled to the deck surface and mounted within the base, the motor being driven by air provided by the air supply inlet tube.

2. The display apparatus according to claim 1, wherein the base is configured having a substantially circular footprint.

3. The display apparatus according to claim 1, wherein the spherical bodies are embodied to be representative of scaled versions of astronomical bodies.

4. The display apparatus according to claim 3, wherein the spherical bodies are embodied to represent a solar system with a central star about which spherical bodies representative of planets orbit.

5. The display apparatus according to claim 3, wherein the spherical bodies are constructed of a foam substance and are covered with a self-illuminating covering.

6. The display apparatus according to claim 1, wherein the source of pressurized air and the air supply input tube are housed internal to the base.

7. An astronomical display apparatus for providing a 3-dimensional view of a plurality of spherical bodies, which are representative of scaled astronomical bodies, with each spherical body supportable above an air cup upon a column of air emitted through the air cup, the display apparatus comprising:

a) a base having an substantially flattened deck surface and an interior chamber partially formed by the flattened deck surface;

b) an air supply inlet tube coupled to the interior chamber of the base to enable an external supply of pressurized air to be coupled thereto;

c) a plurality of air cups, each having an air-support tube situated in a lower cup portion of the air cup that is coupled through the deck surface to the air supply inlet tube, wherein the air-support tube passes air directed to form the column of air that elevates and supports each astronomical body; and d) the plurality of spherical bodies that are representative of scaled astronomical bodies and suitably constructed to be elevated and supported by the column of air;

e) each of the plurality of air cups configured to hold and subsequently elevate a scaled astronomical body when pressurized air is coupled to and emitted from the air cups;

f) wherein the deck surface is rotatably mounted to the base and is arranged to be rotated by an air driven motor coupled to the deck surface so as to cause a slow rotation thereof.

8. The astronomical display apparatus according to claim 7, wherein the astronomical bodies are covered with a self-illuminating covering.

9. The astronomical display apparatus according to claim 7, wherein, the deck surface is provided as a plurality of interchangeable deck surfaces wherein each deck surface represents a distinct collection of astronomical bodies, such as stars, planets, and or moons.

* * * * *